United States Patent [19]
Klaricic

[11] Patent Number: 6,092,432
[45] Date of Patent: Jul. 25, 2000

[54] COUNTERSHAFT TRANSMISSION WITH CONSTANT MESH REVERSE GEARING

[76] Inventor: Boris Klaricic, No 2 Cummins Road, Brighton East, Victoria, 3187, Australia

[21] Appl. No.: 09/296,175

[22] Filed: Apr. 22, 1999

[51] Int. Cl.[7] .................................................. F16H 57/02
[52] U.S. Cl. .................................. 74/325; 74/331; 74/333
[58] Field of Search ............................. 74/325, 330, 331, 74/333, 329

[56] References Cited

U.S. PATENT DOCUMENTS

| | | | |
|---|---|---|---|
| 5,390,560 | 2/1995 | Ordo | 74/331 X |
| 5,517,874 | 5/1996 | Janizewski | 74/325 |
| 5,609,062 | 3/1997 | Reynolds | 74/325 |
| 5,737,978 | 4/1998 | Stine | 74/325 X |

*Primary Examiner*—Khoi Q. Ta
*Attorney, Agent, or Firm*—Young & Thompson

[57] ABSTRACT

A transmission comprising gear case bottom part 72 and rear cover 73; shaft 19 supported on bearings 34 and 37; shaft 20 supported on bearings 33, 38 and 39; shaft 21 supported on bearings 35, 36 and 40 and shaft 22 supported on bearings 41 and 42.

Shaft 19 carries a cluster of seven gears 1, 2, 3, 4, 5, 6 and 7 all of them being integral part of the shaft. These gears are positioned along the shaft from the smallest gear 1 to the largest gear 7. Each gear on shaft 19 is permanently meshed with a gear on either shaft 20 or shaft 21. Gear 1 is meshed with gear 8, gear 2 with gear 9, gear 3 with gear 10, gear 4 with gear 11, gear 5 with gear 12, gear 6 with gear 13 and gear 7 with gear 14. Gear 17 on shaft 21 and gear 18 on shaft 20 are meshed with gear 16 on the output shaft 22. All gears on shafts 20, 21 and 22 in FIG. 1 and gear 65 on shaft 61 in FIG. 2 are rotating on angular contact ball bearings with their inner rings fixed to the shafts. Gears are selected using cone or multiple plate disk clutches driven by hydraulic actuators.

16 Claims, 6 Drawing Sheets

COUNTERSHAFT TRANSMISSION WITH CONSTANT MESH REVERSE GEARING

TECHNICAL FIELD

This invention relates to a conventional multiple speed manual gearbox arranged for use as an automatic transmission having characteristics which could be compared with a continuously variable transmission. In particular, the invention relates to a system of conventional gears, friction clutches and a new gear selecting apparatus representing a combination of components, all worked out to give well balanced design. The parts fit together into a compact assembly and they are designed so that the transmission can be mass-produced using the existing transmission technology and manufacturing techniques.

BACKGROUND

CVT's (Continuously Variable Transmissions) have been, theoretically, the answer to many problems now pressing modern vehicle design. The main advantages being potential improvements in fuel consumption, performance and emissions. CVT's require an extensive new development in transmission technology. Many designs have been proposed, and a number of prototypes built. There are also a small number that have reached production, for example Van Doorne belt driven transmission used in smaller cars powered by engines of approximately 150 to 200 Nm torque. Applications in more powerful cars are the focus of current CVT research. The basic types of CVT's fall into the following categories: Hydrostatic (i.e. hydrostatic pump and motor); Traction (belt or rolling contact); Electric and Ratchet. When any of these transmissions are used independently they have a limited ratio range and have to be of a large capacity to transmit required torque. This can to some extent be overcome by providing a parallel power path as a "boost" system. This creates two systems, one a fixed mechanical route and the second, a continuously variable path which now has a reduced power requirement. These CVT's can become complex since they are based on the technology which is radically different to conventional manual or automatic transmissions and hence require new manufacturing technique. Development programs have also to be extensive to achieve a proven product.

A transmission as described in this invention shows that original targets set for a CVT transmission could be met by use of the existing manual or automatic or combination of both technologies, without having a need to develop new transmission technology. All gears in the present transmission are in a permanent mesh, similar to a modern manual transmission. Gear selecting apparatus has been designed with one part incorporated into a gear itself and second part incorporated into a gear case assembly. These mechanisms are also based on the technology of the existing devices but modified and arranged to form a novel gear selecting apparatus. These mechanisms may be actuated by a hydraulic or hydraulic-electric methods to provide precise and smooth gear shifting. This invention primarily deals with the mechanical aspects of the transmission including the hydraulic gear selecting apparatus.

SUMMARY OF THE INVENTION

It is an object of the present invention to provide a transmission based on the existing automotive manual and automatic transmissions technology. It is also an object of the present invention to provide a transmission with characteristics that could be matched with the theoretical CVT transmission characteristics; for example, performance, fuel consumption and emissions.

Another object of the present invention is to provide a transmission which can be operated without a conventional take off devices such as a manual disk clutches or automatic torque converters.

A further object of the present invention is to provide a transmission for use in more powerful automotive applications, for example in road vehicles requiring more than 300 Nm torque.

A still further object of the present invention is to provide a transmission for use in various industrial applications.

According to the invention, there is provided a transmission with multiple output speed, said transmission comprising:

one drive shaft driven by a power source with its ends received by bearings housed in the transmission casing and the said shaft adapted to hold a fixed array of several different diameter gears;

two driven shafts equally spaced from and parallel to the drive shaft with their ends received by bearings housed in the transmission casing and the said shafts adapted to hold an array of free rotating gears;

a third shaft parallel to drive shaft appropriately supported on a set of bearings housed in the transmission casing and adapted to hold one free rotating gear for reversing direction of rotation of the output shaft;

an output shaft having a fixed gear which is meshed with fixed gears of driven shafts and with a fixed gear of reversed shaft; and gear selecting devices received by both driven shafts and reverse shaft; the said devices capable of transmitting, when engaged with corresponding gears of the said shafts the power and torque from the drive shaft.

gear casing formed so to receive shafts supporting bearings and hydraulic cylinders used to operate gear engaging devices.

Other aspects of the invention will be made readily apparent from the following detailed description of the invention.

DETAILED DESCRIPTION OF THE INVENTION

The invention is based on a cluster of different diameter fixed gears on a drive shaft. All gears of driven shafts and a gear on reversal shaft are free rotating on bearings which can receive axial and radial loads. All free rotating gears carried by the driven shafts and a gear carried by a shaft for reversal of rotation are permanently meshed with the gears of the drive shaft. In the preferred embodiment gear selection devices are positioned between two free rotating gears on the driven shafts. This is also the case for gear selection on the reversal shaft. Gear selection is preferably accomplished by hydraulic actuators between pairs of the free floating gears. The rotational movement and transmission of torque from the drive shaft to the output shaft is transmitted by engaging one of the free rotating gears on the driven shafts or a free rotating gear on a reverse shaft. While rotational movement of the shafts when the torque is being transmitted is maintained by one engaged gear all other gears in the system are free rotating. The gear selection is carried out in sequential order starting from the smallest gear ratio for upshift and from the largest gear ratio for down-shift. The gear change is quick and smooth, controlled by an electronic management system which incorporates engine controls necessary for its operation at maximum efficiency.

Engagement of the first and reverse gears is carried out by the use of multiple disk clutches. The multiple disk clutch reduces the axial force, necessary to transmit a given torque which is directly proportional to number of friction interfaces. The multiple disk clutches are integral part of the transmission and have been designed to operate in "wet" with transmission oil. The oil serves as an effective coolant during clutch engagement, and the use of multiple disks also compensates for the reduced coefficient of friction. Each clutch consists of two parts, one being fixed by grooves to the input free rotating gear of the driven shaft and the second similarly constrained by grooves to slide axially for engagement and disengagement of multiple plates while rotating with the same shaft. The primary function of multiple disk clutch is to permit smooth, gradual connection of two parts having a common axis of rotation. The secondary function is to provide a take off device in a similar manner such as a conventional torque converter used with the automatic transmission. And the last function for the multiple disk clutch is to transmit required torque and power from the drive shaft to the output shaft via engaged pair of gears.

Engagement of all other gears in the transmission is carried out by the cone clutches. These clutches also consist of two parts, one being fixed by grooves to the driven shaft but free to slide axially and the second being incorporated into the free rotating gear on the same shaft. The cone clutches are integral part of the transmission and have also been designed to operate in "wet" with transmission oil. The function of these clutches is to engage the second and next gears in the system, in sequential order to increase the speed of the output shaft at corresponding torque and power levels. Each cone clutch has been sized for each pair of gears to transmit the maximum torque. The cone clutch, embodying the mechanical advantage of the wedge, reduces the axial force necessary to transmit a given torque. The mechanical advantage of a wedge varies as the reciprocal of the sine of the wedge angle. The best mechanical advantage in the cone clutch is to keep the angle between 12° and 18°. If this angle is small enough the clutch will become self-sustaining. To obviate the self-sustaining the tan of the angle must be equal or less than a coefficient of friction between contact surfaces. The cone clutch is inherently fierce in take-up characteristics if reasonable advantage is taken of its wedge action. This is particularly emphasised when rotation is transmitted from driving shaft to the stationary shaft. In this invention the cone clutch engages the next gear in the system which is already in motion with the corresponding gear on the drive shaft. The rotational difference between the first gear ratio and the second gear ratio to be engaged is not significant. During the clutch engagement cycle there is a moment when the clutch friction surfaces act as a speed synchronisers thus eliminating the rotational difference between the preceding and succeeding gear and removing any adverse affects such as shock loads. This in conjunction with the cone clutch friction material selected for "wet" use in the transmission oil provides a quick and smooth shock free engagement.

Axial forces required to move sliding elements of the multiple disk and cone clutches and to maintain pressure between friction surfaces are produced by a hollow hydraulic actuators. Each hydraulic actuator is formed with a hole in the middle of it to accommodate the shafts. The bodies of the hydraulic actuators are conveniently lodged into the collars formed as an integral part of gear casing which provide required strength to withstand the loading generated by the hydraulic pressure. The collars may be suitably braced on opposite sides of the collars with longitudinal ribs or like bracing. The pressure is supplied by a hydraulic variable speed pump being driven by a gear from the drive shaft. The pump is sized to provide adequate fluid flow and pressure as required by the multiple disk and cone clutches proposed for this transmission.

In preferred format, the drive shaft accommodates seven driving gears with an overall ratio, closely approaching requirement for the theoretical CVT transmission. The number of gears on drive shaft can exceed seven, the absolute limit being governed by an overall gear ratio, its size and application. More driving gears in the system would provide transmission with a larger number of gear ratios and hence the closer CVT transmission characteristics would be achieved. However, from practical point of view transmission with large number of gears would become more complex and may be uneconomical to produce. To show advantages of the seven speed transmission as described in this invention an attempt has been made to compare it against a modern four speed automatic transmission. To better understand the features of the transmission and its advantages, a modem up to date car fitted with three litre engine and four speed automatic transmission has been selected for comparison purpose. For simplicity reasons, engine speeds for both transmissions has been fixed at 3500 revolutions per minute.

The selected car fitted with a four speed automatic transmission travels at speeds in corresponding gears as follows:

| gear | ratio | engine speed | car speed |
|------|-------|--------------|-----------|
| 1st  | 2.785 | 3500 r/min   | 34.65 km/h |
| 2nd  | 1.545 | 3500 r/min   | 62.46 km/h |
| 3rd  | 1.000 | 3500 r/min   | 96.50 km/h |
| 4th  | 0.694 | 3500 r/min   | 139.05 km/h |

According to the invention if seven speed transmission was fitted to the selected car in lieu of four speed automatic then that car would travel at the following speeds:

| gear | ratio | engine speed | car speed |
|------|-------|--------------|-----------|
| 1st  | 3.286 | 3500 r/min   | 34.40 km/h |
| 2nd  | 2.750 | 3500 r/min   | 41.11 km/h |
| 3rd  | 2.000 | 3500 r/min   | 56.52 km/h |
| 4th  | 1.545 | 3500 r/min   | 73.17 km/h |
| 5th  | 1.000 | 3500 r/min   | 113.04 km/h |
| 6th  | 0.765 | 3500 r/min   | 147.76 km/h |
| 7th  | 0.500 | 3500 r/min   | 226.08 km/h |

The final drive ratio for the invention has been calculated to be 3.5 to produce identical starting torque as four speed automatic. This is a realistic scenario and it shows that a transmission according to the present invention travels more kilometres in all gears except the first gear where the speeds are almost equal for both cases. Therefore the present invention is considerably more fuel efficient than conventional four speed automatic transmission. Other advantages of the invention would be in reduced emissions and prolonged engine life because of the engine running at constant speeds for the transmission optimum performance.

Operation of the transmission is advantageously under the control of a programmable logic controller. Speed sensor would be provided to monitor speed of input or output shafts to allow timely selection of gears to be quick and precise to optimise output torque and power of the drive unit. The control system can be made for transmission to be driven in automatic or in manual mode. In automatic mode car speed would be controlled by a transmission gear selection management system. In this mode the engine would be running at constant speed except when the first and reverse gears are used or during the gear change sequence where the speed difference between gears is present. The transmission control system does not form a part of this invention.

The kind of transmission arrangement as described in this invention is suitable for a wide range of powerful applications as required by the road vehicles as well as for industrial applications in modified form.

As mentioned above the present invention is based on the existing technology of modern manual transmission. The invention uses basic components found in the manual transmission and in combination with the new gear selection devices and design arrangement incorporating a number of design modifications applied in this invention resembles the performance of a CVT transmission. The design modifications or variations of the existing manual transmission components and other mechanical components employed by this invention do not require the development of a new technologies.

The operation of the transmission is described in the following steps:

1. Input shaft, referred herein as a drive shaft receives rotational movement from the main drive unit, for example petrol engine or diesel engine or electric motor. The drive shaft has an array of fixed gears which are permanently meshed with the gears of two intermediate shafts.

2. The free rotating gears of the intermediate shafts referred herein as a driven shafts are engaged by engaging devices in sequential order for torque to be transmitted from the input shaft.

3. The driven shafts transmit torque to the output shaft via a pair of fixed gears.

4. When the output shaft reaches predetermined maximum speed the speed sensor sends a signal to selection device via the main controller to disengage the first gear from power source and to engage the second gear to further increase the speed of the output shaft.

5. Up-shift of gears is continued in the same manner as described in the above procedure till the highest gear ratio is reached. Down-shift of gears is in reversed order to upshift.

6. To reverse rotation of the output shaft a free rotating gear is fitted to the driven shaft, while a matching gear and selection device are fitted to reverse shaft. The reverse shaft fixed gear is meshed with the output shaft fixed gear for final transmission.

7. The up-shifting and downshifting of the gears is very quick and highly accurate and is essential for optimum and consistent performance 8. The gear shift controller disables the engagement of any of other gears if the reverse gear is engaged, and the engagement of a reverse gear is prevented if any of the forward gears is selected. The controller and its logic do not form part of this invention.

Having broadly described the transmission and gear selection system, a detailed example will now be described with the reference to the accompanying drawings. The same item numbers are used for identical components of figures.

DESCRIPTION OF THE DRAWINGS

Referring to FIG. 1, there is shown transmission apparatus comprising gear case-bottom part 72 and rear cover 73; shaft 19 supported on bearings 34 and 37; shaft 20 supported on bearings 33, 38 and 39; shaft 21 supported on bearings 35, 36 and 40 and shaft 22 supported on bearings 41 and 42.

Figure 1:
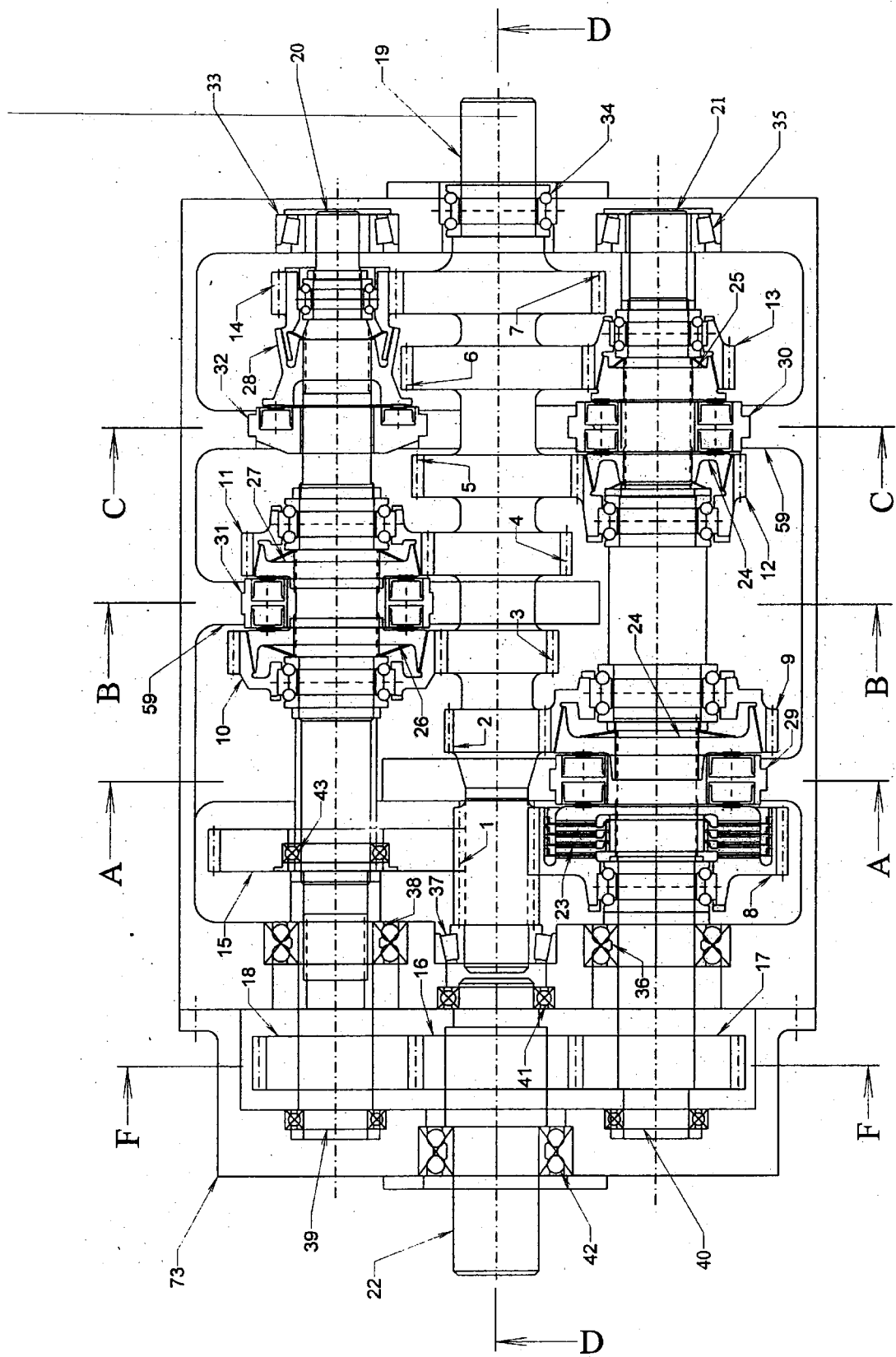
FIG. 1 is a general view of a seven speed transmission according to the invention.

Shaft 19 carries a cluster of seven gears 1, 2, 3, 4, 5, 6 and 7 all of them being integral part of the shaft. These gears are simply positioned along the shaft from the smallest gear 1 to the largest gear 7. Each gear on shaft 19 is permanently meshed with a gear on either shaft 20 or shaft 21. As it can be seen gear 1 is meshed with gear 8, gear 2 with gear 9, gear 3 with gear 10, gear 4 with gear 11, gear 5 with gear 12, gear 6 with gear 13 and gear 7 with gear 14. Gear 17 on shaft 21 and gear 18 on shaft 20 are meshed with gear 16 on the output shaft 22. All gears on shafts 20, 21 and 22 in FIG. 1 and gear 65 on shaft 61 in FIG. 2 are rotating on angular contact ball bearings with their inner rings fixed to the shafts. These bearings can receive radial and axial loads.

Figure 2:
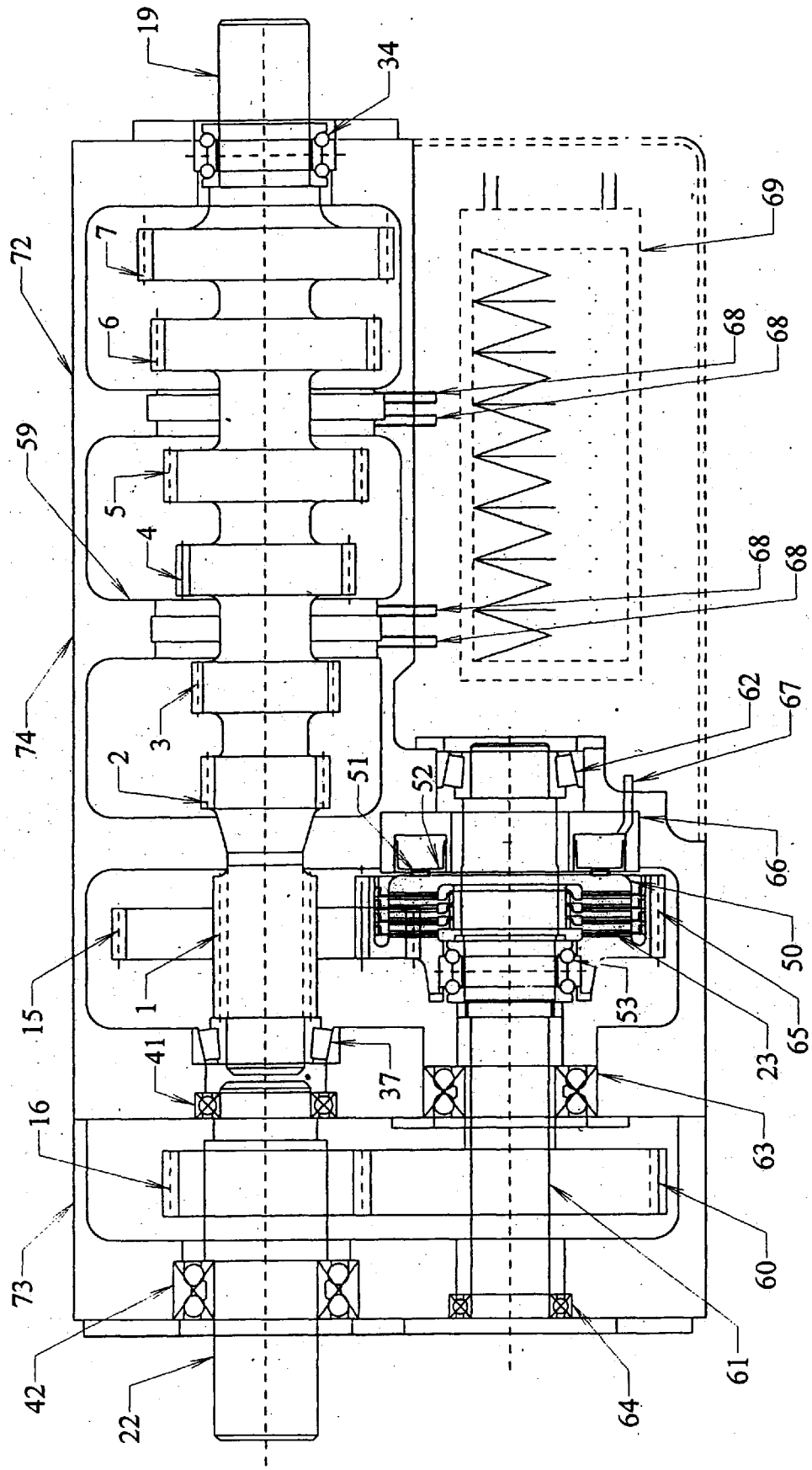
FIG. 2 is a sectional view D—D of FIG. 1 showing input shaft, output shaft, reverse gear mullet disk clutch and hydraulic power pack.

FIG. 2 is cross sectional view D—D of FIG. 1 and it has been generated to show reverse shaft 61, reverse gear multiple disk clutch 23, gear 15 of shaft 20 as shown in FIG. 1 meshed with reverse gear 65 and gear 60 meshed with gear 16 on output shaft 22. FIG. 2 also shows arrangement of a hydraulic pump, driven by a gear (not shown) which can be meshed with gear 7 of input shaft 19. A bank of valves is contained in body 69. Each valve supplies required fluid pressure to hydraulic cylinders used to selectively engage the gears (described below) via typical supply port 67 and fluid return via typical port 68.

Figure 3:
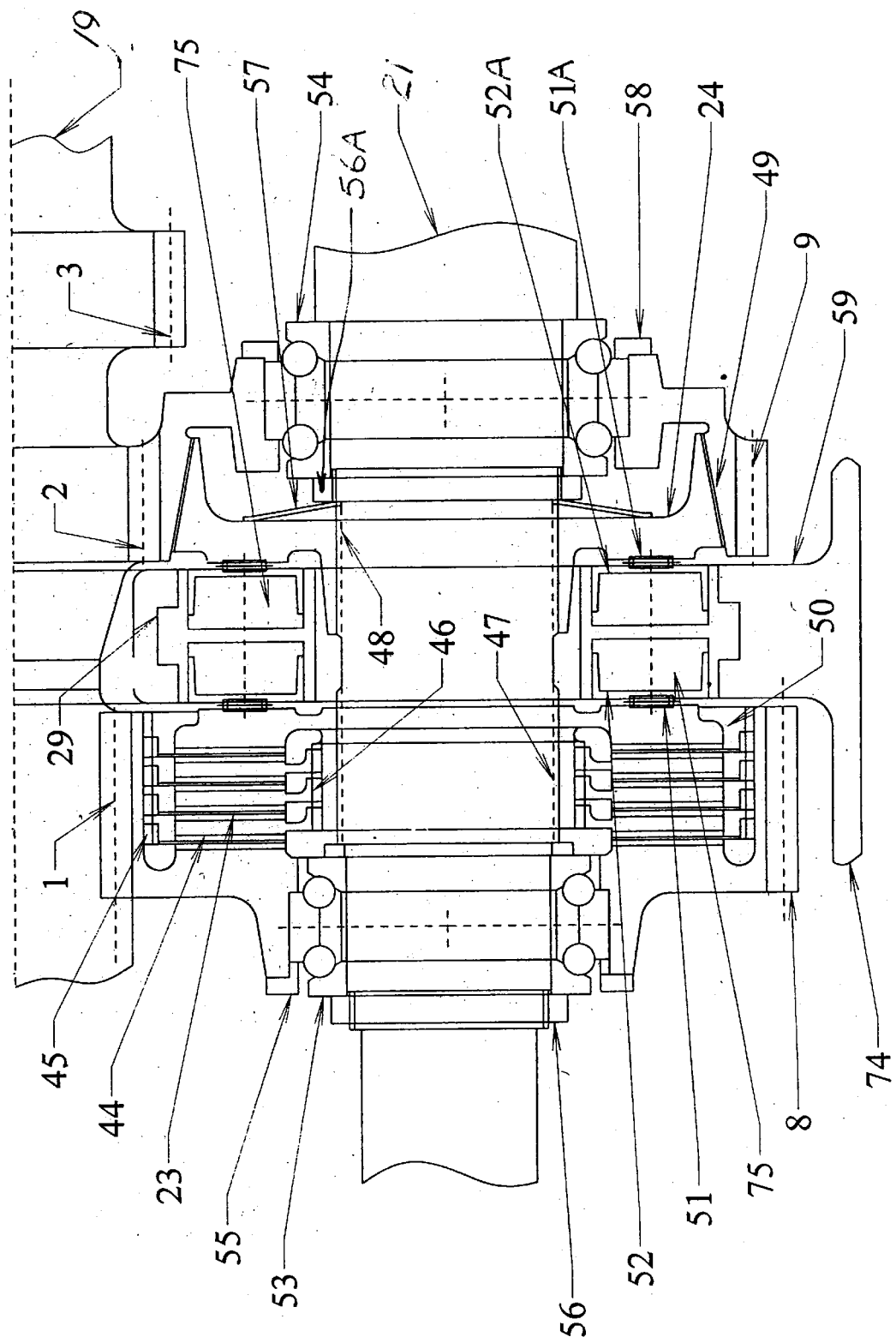
FIG. 3 is an enlarged view of mullet-disk clutch and cone clutch as shown in FIG. 1 used to operate first and second gear respectively.

FIG. 3 shows detailed enlarged view of multiple disk clutch operating gear 8, cone clutch operating gear 9. Referring to FIG. 3 it can be seen that the transmission of torque from the input shaft 19 to the driven shaft 21 is realised as described in the following passage.

Input shaft 19 is connected to the power source and rotates together with integral gears 1 and 2. Gears 8 and 9 are free rotating on bearings 53 and 54 and are in permanent mesh with gears 1 and 2. A hydraulic actuator 29 having pistons 75 and 75A is conveniently received by the collar 59 formed from the gear case wall 74 and shaped so to obviate any radial or axial movement of the actuator itself. The crowns of pistons 75 and 75A are formed to clip in housings of thrust bearing 51 and 51A. The function of thrust bearings is to provide relative rotational movements between multiple disk clutch pressure plate 50 and piston 52 and between cone clutch 24 and piston 52A whether in idling or power transmitting mode. Multiple disk clutch comprises of driving disks 23 and driven disks 44. Driving disks 23 are constrained but free to slide on grooves 45 formed in gear 8.

Driven disks 44 are constrained but free to slide on grooves 46 which are formed on outer surface of the pressure plate hub 50. The pressure plate hub inner surface grooves are received by grooves formed in shaft 21. When hydraulic fluid pressure is supplied via adaptor 68 to chamber 75, cylinder 52 moves and exerts an axial force onto pressure plate 50 forcing it to slide on grooves 47 of shaft 21 thus causing progressive clamping of driving disks 23 against driven disks 44 necessary for transmission of the torque. Driving disks 23 incorporate a wave springs which when hydraulic pressure is cut off retract driven disks and pressure plate 50 into free rotating position. The above description of operation of multiple disk clutch is applicable to first and reverse gears only. Other gears in this invention are operated by the cone clutches but activated by the same kind of hydraulic system as applied to multiple disk clutch. So it can be seen that driving cone part 24 slides on grooves 48 formed in shaft 21. When hydraulic fluid pressure is supplied o chamber 75A, piston 52A moves and exerts an axial force onto driving cone 24 forcing it to slide on grooves 48 of shaft 21 thus progressively engaging driven cone 49 formed in gear 9 for transmission of the torque. Diaphragm spring 57 is received by the shaft 21 with its inner diameter leaning against bearing retaining nut 56A and with its outer diameter leaning against the driving cone part 24. The said spring provides necessary load required to move driving part 24 of cone clutch from power transmitting mode into neutral position where it freely rotates with its parent shaft.

Figure 5:
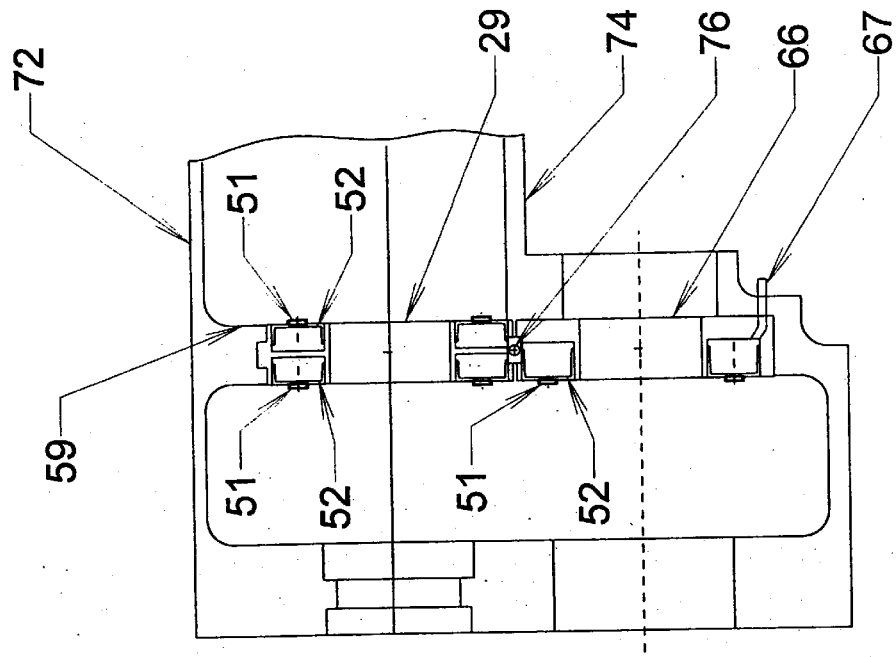
FIG. 5 is a section G—G of FIG. 4 showing arrangement of hydraulic actuators for reverse, first and second gear.
Figure 4:
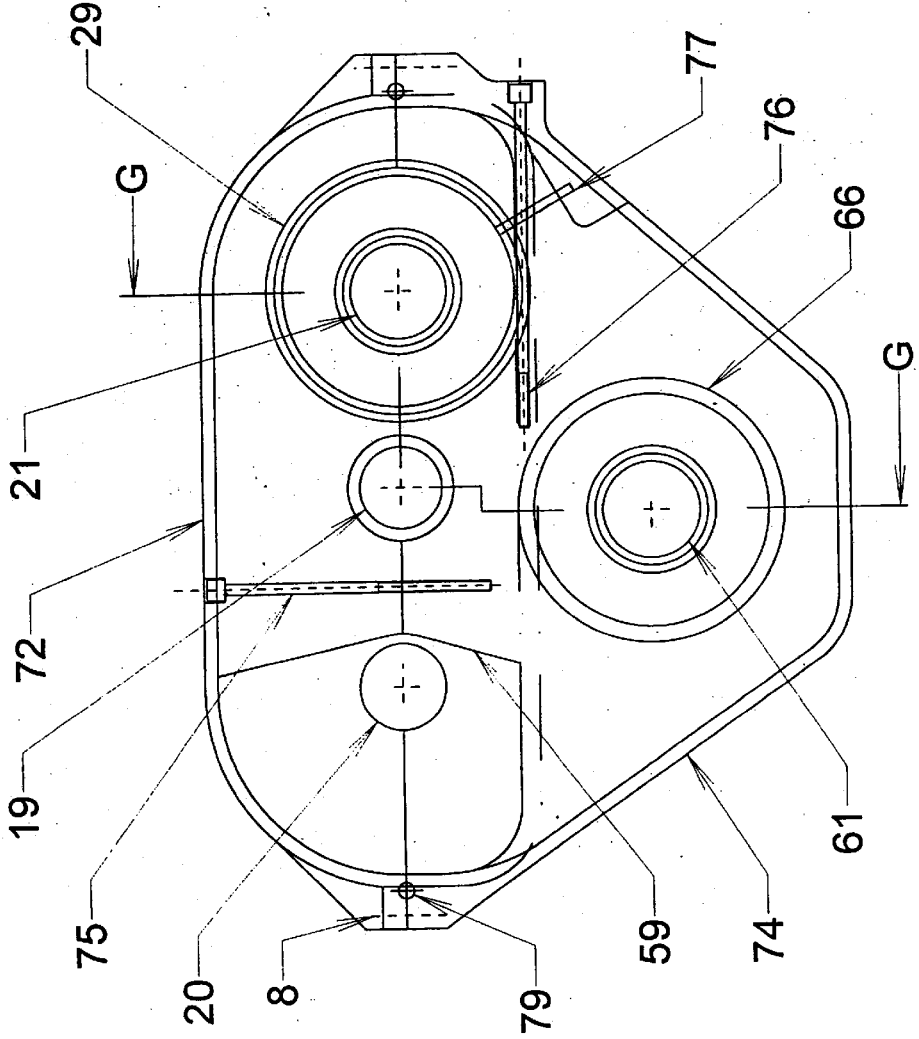
FIG. 4 is a cross section A—A of FIG. 1 showing arrangement of hydraulic actuators for reverse, first and second gear.

Referring now to FIGS. 4 and 5 further aspects of the preferred embodiment will be illustrated.

FIG. 4 represents a cross section A—A of FIG. 1 showing hydraulic cylinders 29 and 66 operating first, second, and reverse gear; the hydraulic cylinders 29 and 66 embedded into collar 59 formed as an integral part of gear casing arrangement. Gear casing upper part 72 is bolted to lower part 74 by bolts with a seal 79 appropriately positioned between those two casing halves. Shafts 19, 20, 21 and 61 relative positions to each other is shown in this figure too. The hydraulic pressure to each actuator is supplied via two ports 67 and 77. The same kind of ports are fitted for pressure supply and for pressure relief.

FIG. 5 is a cross section G—G of FIG. 4 showing embodiment of hydraulic cylinders 29 and 66 into upper casing 72 and lower casing 74 respectively Cylinder 29 operates first and second gear as shown in FIGS. 1 and 3, while cylinder 66 operates reverse multiple disk clutch as shown in FIG. 2. The cylinders are received by the collar 59 consisting of two halves, one belonging to upper case and the other belonging to the lower case. The cylinders are placed into groves formed in the said collars so to prevent their radial or axial movement when subjected to hydraulic pressure.

Figure 6:
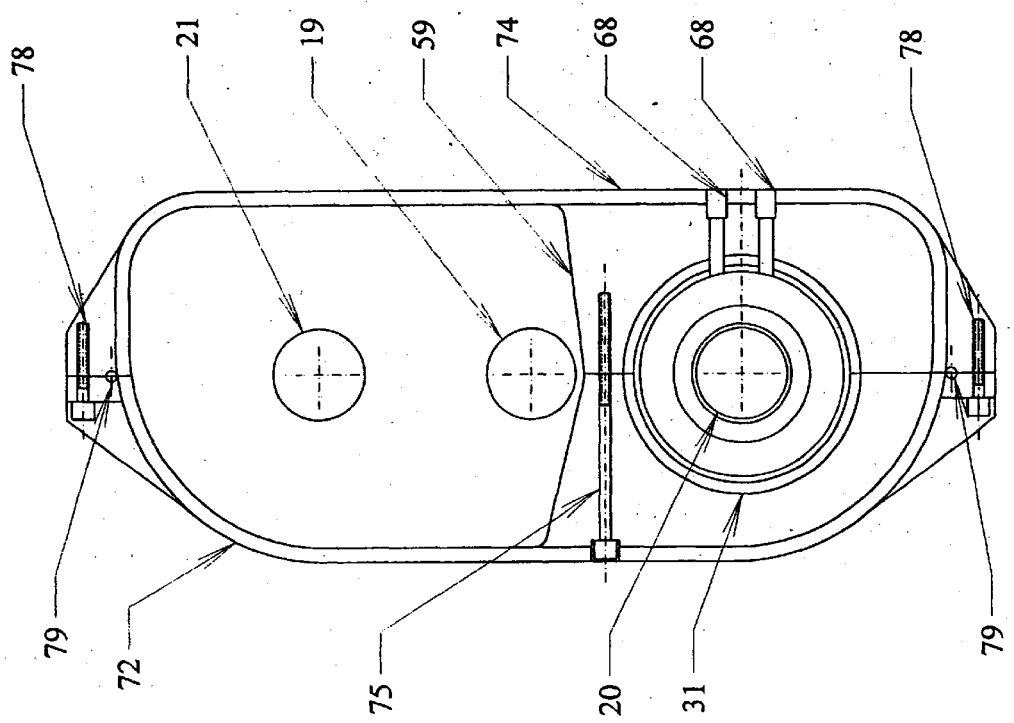
FIG. 6 is a cross section B—B of FIG. 1 showing arrangement of hydraulic actuators for third and fourth gear.

FIGS. 6 represents a cross section B—B of FIG. 1 showing embodiment of hydraulic cylinder 31 which operates third and fourth gear. The collar 59A having one part protruding from upper case 72 and other part protruding from lower case 74. The cylinders are placed into groves formed in the said collar so to prevent its radial or axial movement when subjected to hydraulic pressure. Ports 68 are provided for supply and relieve of hydraulic pressure.

Figure 7:
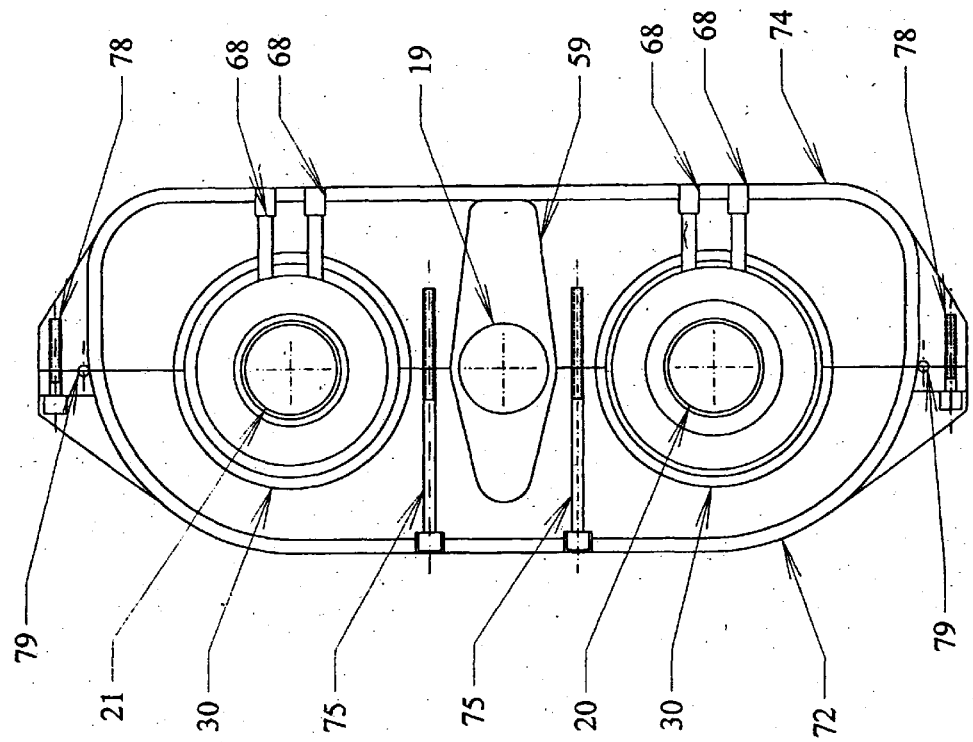
FIG. 7 is a cross section C—C of FIG. 1 showing arrangement of hydraulic actuators for fifth, sixth and seventh gear.

Similarly FIG. 7 represents a cross section C—C of FIG. 1 showing hydraulic cylinders 30 used to operate fifth, sixth and seventh gear. The said cylinders are embedded into collar 59B in similar manner as described for collar 59 at FIG. 6.

Figure 8:
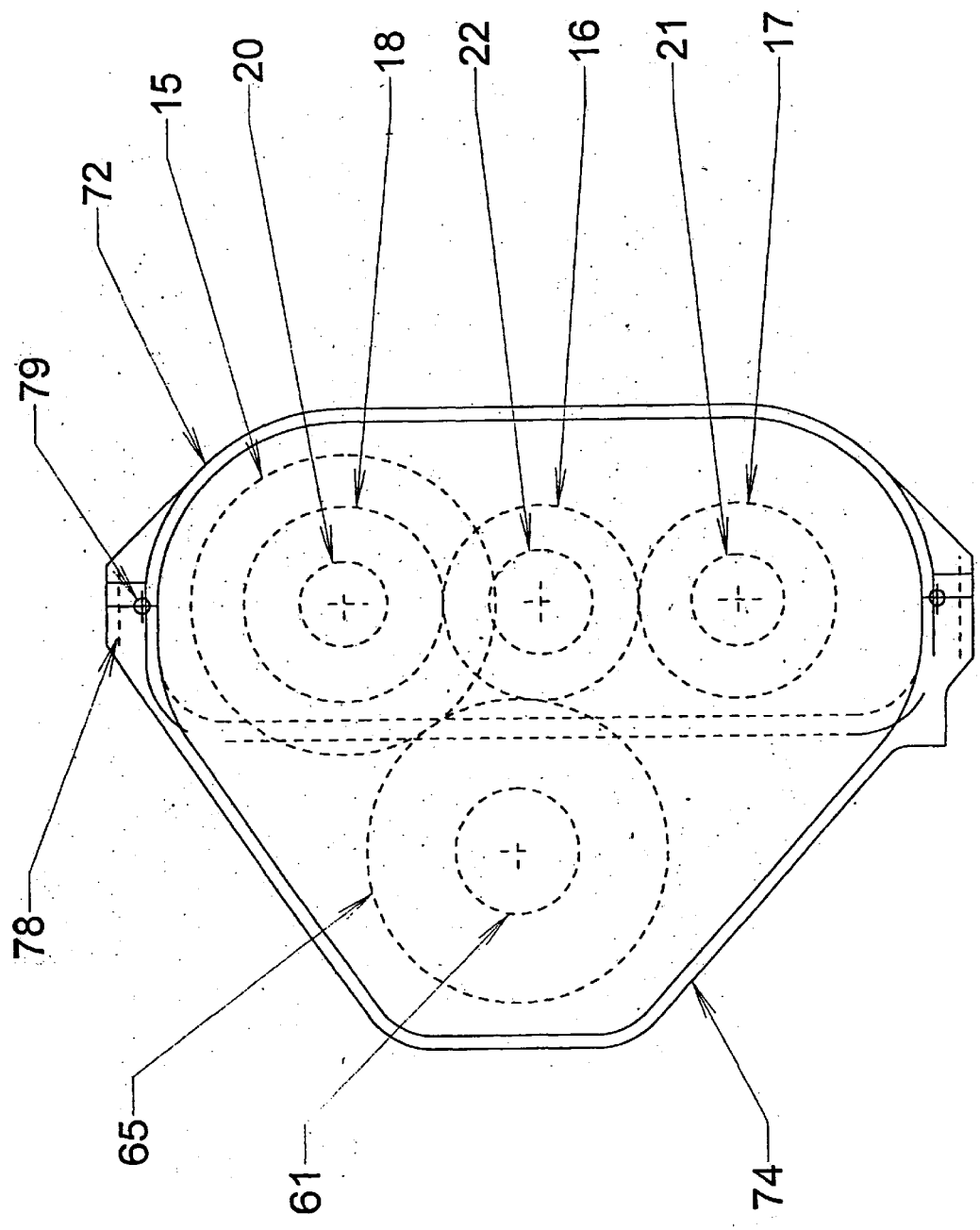
FIG. 8 is a cross section F—F of FIG. 1 showing gear arrangement between drive shaft, driven shafts and reverse shaft.

FIG. 8 represents a cross section F—F showing gear arrangement between output gear 16 of shaft 22, gears 17 of shaft 21, gear 18 of shaft 20 fixed to driven shafts and gear 65 of reverse shaft 61.

This invention exemplifies the use of a multiple disk clutch and cone friction clutches as a devices for engaging gears. However, it will be apparent to ones skilled in the art that other kinds of conventional devices in existence could be adapted to and used with the hydraulic actuators as described in this invention without departing from the concept of the invention.

It will be appreciated that many modifications can be made to the transmission general arrangement system as exemplified above without departing from the broad ambit and scope of the invention.

The claims defining the invention are as follows:

1. A transmission comprising a driving shaft carrying input drive to the transmission, an output shaft carrying output drive from the transmission, a first driven shaft and a second driven shaft, the driving shaft having a cluster of several gears, the driven shafts each having a fixed gear and a number of free rotating gears which are meshed with corresponding gears of said driving shaft, a reverse shaft for reversing direction of rotation of the output shaft, the reverse shaft being parallel to said driving shaft and having a fixed gear and a free rotating gear, the free rotating gear of the reverse shaft being meshed with a free rotating gear of one of said driven shafts, the output shaft having a fixed gear which is meshed with said fixed gears of the said driven and reverse shafts, all said shafts being received by bearings which are disposed in said casing, said transmission having gear selectors enabling variable output from the transmission by selectively engaging said gears.

2. A transmission according to claim 1 wherein said free rotating gear of said reverse shaft has a said gear selector comprising a multiple disk clutch activated by pistons of hollow hydraulic cylinders which are held in collars formed as extensions of said casing.

3. A transmission according to claim 1 wherein at least one of said free rotating gears of said driven shafts has a said gear selector comprising a cone clutch activated by pistons of hollow hydraulic cylinders which are held in collars formed as extensions of said casing.

4. A transmission according to claim 1 wherein at least one of said free rotating gears of said driven shafts is formed to have disengageable conical friction surfaces forming respective driven and driving parts of a cone clutch for engagement of selected gears.

5. A transmission according to claim 1 wherein each driven shaft has axial guide grooves guiding a driving part of a cone clutch, said gear selector comprising a hydraulic cylinder to enable the driving part to move axially under pressure from the hydraulic cylinder for engagement of the cone clutch.

6. A transmission according to claim 1 wherein at least one of said gear selectors comprise a hydraulic cylinder assembly having an outer ring, the casing having collars extending from upper and lower casing walls, the outer ring being retained in said collars, said collars having means for withstanding pressure generated by said hydraulic cylinder assembly.

7. A transmission according to claim 1 wherein at least one of said gear selectors comprise a hydraulic cylinder assembly, the hydraulic cylinder assembly having a pair of chambers provided to receive pistons which are axially movable by fluid pressure supplied to said chambers.

8. A transmission according to claim 1 wherein at least one of said gear selectors comprise a hydraulic cylinder assembly, the hydraulic cylinder assembly having a pair of chambers provided to receive pistons which are axially movable by fluid pressure supplied to said chambers, the pistons having grooved channels to accommodate needle roller thrust bearings to facilitate rotational movement of an engaged gear relative to said hydraulic cylinder assembly.

9. A transmission according to claim 1 wherein one of said gear selectors comprises a multiple disk clutch operatively engaging said free rotating gear of said reverse shaft in which grooves are formed therein internally to adjustably fit in a plurality of driving elements of the said multiple disk clutch.

10. A transmission according to claim 1 where one of said gear selectors comprises a multiple disk clutch having an axially moveable pressure plate, at least one of said driven shafts having grooves formed to receive mating grooves of the axially movable pressure plate of multiple disk clutch.

11. A transmission according to claim 1 where one of said gear selectors comprises a multiple disk clutch having an axially moveable pressure plate, at least one of said driven shafts having grooves formed to receive mating grooves of the axially movable pressure plate of multiple disk clutch, the axially movable pressure plate having grooves to adjustably fit in a plurality of driven elements of the multiple disk clutch.

12. A transmission according to claim 1 wherein one of said gear selectors comprises a multiple plate clutch for selection of the lowest forward gear.

13. A transmission according to claim 1 wherein one of said gear selectors comprises a multiple plate clutch for selection of reverse gear.

14. A transmission according to claim 1 wherein at least two of said free rotating gears are formed as a back-to-back pair on opposite sides of a said gear selecting the said gear selector between said back-to-back pair comprising back-to-back hydraulic cylinder assemblies.

15. A transmission according to claim 1 wherein at least two of said free rotating gears are formed as a back-to-back pair on opposite sides of a said gear selecting the said gear selector between said back-to-back pair comprising back-to-back hydraulic cylinder assemblies, said back-to-back pair of free rotating gears comprising back-to-back cone clutches for engaging drive from said corresponding fixed gears.

16. A transmission according to claim 1 wherein at least two of said free rotating gears are formed as a back-to-back pair on opposite sides of a said gear selecting the said gear selector between said back-to-back pair comprising back-to-back hydraulic cylinder assemblies, said back-to-back pair of free rotating gears comprising a multiple plate clutch and a cone clutch for engaging drive from said corresponding fixed gears.

* * * * *